(12) United States Patent
Lee

(10) Patent No.: US 7,003,104 B2
(45) Date of Patent: Feb. 21, 2006

(54) APPARATUS FOR OPENING AND CLOSING COVER OF CELLULAR PHONE

(75) Inventor: Geun Ju Lee, Seoul (KR)

(73) Assignee: Hanbit Precision Co., Ltd., Seoul (KR)

( * ) Notice: Subject to any disclaimer, the term of this patent is extended or adjusted under 35 U.S.C. 154(b) by 219 days.

(21) Appl. No.: 10/734,769

(22) Filed: Dec. 12, 2003

(65) Prior Publication Data

US 2005/0078817 A1   Apr. 14, 2005

(30) Foreign Application Priority Data

Oct. 13, 2003   (KR) ...................... 10-2003-0071228
Dec. 5, 2003   (KR) ...................... 10-2003-0088110

(51) Int. Cl.
  *H04M 1/00*   (2006.01)
  *H04B 1/38*   (2006.01)

(52) U.S. Cl. ............................... 379/433.13; 455/575.3

(58) Field of Classification Search ........... 379/433.13, 379/433.12; 455/575.3, 575.4, 575.1, 90.3
See application file for complete search history.

(56) References Cited

U.S. PATENT DOCUMENTS 6,850,784 B1 *   2/2005   SanGiovanni .......... 379/433.12

2003/0068988 A1 *   4/2003   Janninck et al. ........ 379/433.13
2004/0203517 A1 *   10/2004   Park et al. ............. 379/433.13
2005/0141703 A1 *   6/2005   Hickey et al. ......... 379/433.13

* cited by examiner

*Primary Examiner*—Jack Chiang
(74) *Attorney, Agent, or Firm*—Ladas & Parry LLP

(57) ABSTRACT

The present invention relates to an apparatus for opening and closing a cover of a cellular phone in which a slide module capable of slidably opening and closing a cover of a cellular phone is constructed in a structure of using an elastic force of a spring, so that it is possible to precisely recognize an opening and closing operation of a cover, and an opening and closing operation of a cover is efficiently achieved. The apparatus includes a body having a keypad, a cover being engaged to the body slidably in forward and backward directions and having a display panel, an upper plate engaged to a lower side of the cover, a lower plate engaged to an upper side of the body, wherein the upper plate is slidably engaged to the lower plate, a rotation plate rotatably engaged between the upper and lower plates and adapted to slidably move the upper plate in forward and backward directions with respect to the lower plate, an elastic support unit having one end fixed to the rotation plate and the other end movably supported by an upper surface of the lower plate, wherein the elastic support unit is adapted to elastically support the rotation plate when the upper plate is slidably moved, and a stopper unit provided in the upper and lower plates and adapted to limit a slidable movement of the upper plate with respect to the lower plate.

20 Claims, 21 Drawing Sheets

APPARATUS FOR OPENING AND CLOSING COVER OF CELLULAR PHONE

BACKGROUND OF THE INVENTION

1. Field of the Invention

The present invention relates to an apparatus for opening and closing a cover of cellular phone in which a cover is opened and closed slidably with respect to a body in forward and backward directions, and in particular to an apparatus for opening and closing a cover of a cellular phone in which a sliding movement of a cover with respect to a body is performed by an elastic force of a spring, and an opening and closing operation of a cover is precisely performed.

2. Description of the Background Art

Generally, a cellular phone includes a cover and a body. The cellular phone is classified into a bar type, a flip type, a folder type, etc. based on an opening and closing method of a cover with respect to a body.

In the bar type cellular phone, a keypad is exposed to the outside, so that the keypad may be easily damaged. In order to overcome the above problem, a flip type cellular phone has been developed. However, in this case, the length of the body is extended, so that it is inconvenient to use it.

In order to overcome the disadvantages of the bar type and flip type cellular phones, a folder type cellular phone has been developed. In this case, a hinge portion, which is a connection portion between the cover and body, may be easily damaged due to a repeated opening and closing operation of the folder when using it.

In order to overcome the disadvantages of the folder type cellular phone, a slide type cellular phone has been developed (shown in FIG. 1). The slide type cellular phone includes a body 1 having a keypad 1a formed of a plurality of key input buttons in an upper side of the body 1, and a cover 2 engaged in such a manner that the cover 2 is slidable in a direction of an upper side of the body 1.

A LCD (Liquid Crystal Display) is engaged to an upper side of the cover 2 in such manner that the cover with the LCD is slidably moved in the upper surface of the body by a slide module (not shown) in the forward and backward directions.

In the conventional slide type cellular phone, the slide module has a member for slidably guiding the cover from the body when the cover is slidably moved with respect to the body wherein the member is formed in a rail structure. Therefore, when an external impact is applied to the body, the sliding structure may be easily broken due to its structural characteristic.

In addition, the slide type cellular phone, when opening and closing the cover, a user cannot accurately recognize an opening or closing completion state due to a sliding movement for thereby causing inconvenience.

In the Korean patent laid-open No. 2002-74870, the slide cellular phone using a slide module has been disclosed.

As shown in FIG. 2, the conventional slide module includes a sliding member 410 in which fixtures 412 and 413 adapted to fix a body to a slide module 312 are engaged to a slide module 312, wherein the slide member 410 enables the cover and the body to slide, a support plate 420 fixed to the body for supporting the sliding member 410, and a guide plate 430 adapted to fix the sliding member 410 attached to the support plate 420 and having a plane surface 431 having a guide hole h1 for guiding a sliding movement of the sliding member 410.

Here, the slide member 410 includes a plate spring 411 attached to the support plate 420 by the guide plate 430, the fixtures 412 and 413 vertically passing through the plate spring 411 for fixing the body to the slide module 312 and being distanced from each other, and a protrusion 414 protruded from a certain portion of the plate spring 411 so that a ball 415 is inserted between the plate spring 411 and the support plate 420.

Two holes h4 and h5 are formed in the bottom of the support plate 420 in order for the ball 411 to be lock-engaged. Screw holes are formed in the first and second fixtures 412 and 413 for inserting screws 401 and 402 therein.

In the conventional slide type cellular phone, when a user slides the cover from the body, the ball 415 is selectively lock-engaged to the holes h4 and h5 of the support plate 420, so that opening and closing states are recognized by a click sound.

Therefore, the user can recognize that the sliding operation of the cover is completed, but a certain sound occurs when opening and closing the cover, and an assembling procedure is difficult due to its structural characteristic. In addition, it is impossible to achieve a smooth sliding operation of the cover.

SUMMARY OF THE INVENTION

Accordingly, it is an object of the present invention to provide an apparatus for opening and closing a cover of a cellular phone which is capable of achieving a smooth opening and closing operation of a cover in such a manner that a cover is slidably moved from a body based on an elastic force using a spring wherein a user can precisely recognize an opening and closing state of a cover for thereby enhancing a user's convenience.

To achieve the above object, there is provided an apparatus for opening and closing a cover of a cellular phone, comprising a body having a keypad, a cover being engaged to the body slidably in forward and backward directions and having a display panel, an upper plate engaged to a lower side of the cover, a lower plate engaged to an upper side of the body, wherein the upper plate is slidably engaged to the lower plate, a rotation plate rotatably engaged between the upper and lower plates and adapted to slidably move the upper plate in forward and backward directions with respect to the lower plate, an elastic support unit having one end fixed to the rotation plate and the other end movably supported by an upper surface of the lower plate, wherein the elastic support unit is adapted to elastically support the rotation plate when the upper plate is slidably moved, and a stopper unit provided in the upper and lower plates and adapted to limit a slidable movement of the upper plate with respect to the lower plate.

To further achieve the above object, there is further provided an apparatus for opening and closing a cover of a cellular phone, comprising a body having a keypad, a cover engaged to the body slidably in forward and backward directions and having a display panel, a rotation plate rotatably engaged to an engaging groove formed in an upper surface of the body and adapted to slidably move the cover in forward and backward directions with respect to the body, an elastic support unit having one end fixed to the rotation plate and the other end movably supported by a bottom surface of the engaging groove, wherein the elastic support unit is adapted to elastically support the rotation plate when the upper plate is slidably moved, and a stopper unit provided in the body and the cover, respectively, and adapted to limit a slidable movement of the cover being opened and closed with respect to the body.

The elastic support unit includes a pair of cooperation bars each having one end engaged to the rotation plate, respectively, and cooperating with each other when the rotation plate is rotated, a spring member engaged to an outer surface of the cooperation bars and being contracted and extended when the cooperation bars are moved, a support piece fixed to the other ends of the cooperation bars wherein an outer surface of the support piece is formed in a circular shape, and a fixture engaged to be opposite to the upper surface of the lower plate and having a support surface surface-contacting with an outer surface of the support piece.

The stopper unit includes an engaging groove and a fixing groove formed at both sides of the forward and backward portions of the upper plate, and a stopper protruded from a bottom surface of the lower plate and adapted to limit a movement of the upper plate in such a manner that the engaging groove and the fixing groove are engaged.

A groove is formed on a bottom surface of the upper plate in a vertical direction with respect to the moving direction of the upper plate, and an engaging member capable of slidably moving the upper plate is fixed to one end of the rotation plate when the engaging member is slidably moved in the interior of the groove.

There are further provided a flange portion formed at left and right sides of the upper plate, and a guide rail provided in the lower plate to correspond with the flange portion and adapted to support the upper plate which is slidably moved with respect to the lower plate.

There is further provided a guide shoulder portion protruded from an upper surface of the lower plate and being capable of distancing the rotation plate from the lower plate for thereby achieving a smooth rotation.

To achieve the above object, there is provided an apparatus and opening and closing a cover of a cellular phone, comprising a body having a keypad, a cover engaged to the body slidably in forward and backward directions and having a display panel, an upper plate engaged to a lower surface of the cover wherein a first gear is provided on a bottom surface of the upper plate, a lower plate provided on an upper surface of the body wherein the upper plate is slidably engaged to the lower plate, and a second gear engaged with the first gear is rotatably engaged to the lower plate, an elastic support unit having one end fixed to the second gear and the other end movably supported by an upper surface of the lower plate, wherein the elastic support unit elastically supports the second gear when the upper plate is slidably moved, and a stopper unit provided in the upper and lower plates and adapted to limit a slidable movement of the upper plate with respect to the lower plate.

To achieve the above object, there is provided an apparatus for opening and closing a cover of a cellular phone, comprising a body having a keypad, a cover engaged to the body slidably in forward and backward directions and having a display panel, a first gear integrally formed with an inner surface of the cover, a second gear rotatably engaged to an engaging groove formed on an upper surface of the body, and engaged with the first gear, and adapted to slidably move the cover in forward and backward directions with respect to the body, an elastic support unit having one end fixed to the second gear and the other end movably supported by a bottom surface of the engaging groove and adapted to elastically support the second gear when the cover is slidably moved, and a stopper unit provided on a bottom surface of the cover and adapted to limit a slidable movement of the cover with respect to the body.

The elastic support unit includes a pair of cooperation bars each having one end engaged to the second gear, respectively, and cooperating with each other when the second gear is rotated, a spring member engaged to an outer surface of the cooperation bars and being contracted and extended when the cooperation bars are moved, a support piece fixed to the other ends of the cooperation bars wherein an outer surface of the support piece is formed in a circular shape, and a fixture engaged to be opposite to an upper surface of the lower plate and having a support surface surface-contacting with an outer surface of the support piece.

A locking unit capable of fixing the upper plate with respect to the lower plate includes an engaging protrusion outwardly protruded from the flange portion of the upper plate, and at least more than one locking groove provided in an inner side of the guide rail of the lower plate and adapted to correspond with the lower plate.

The first gear is formed of a rack gear, and the second gear is formed of a pinion gear.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

[First Embodiment]

Figure 1:
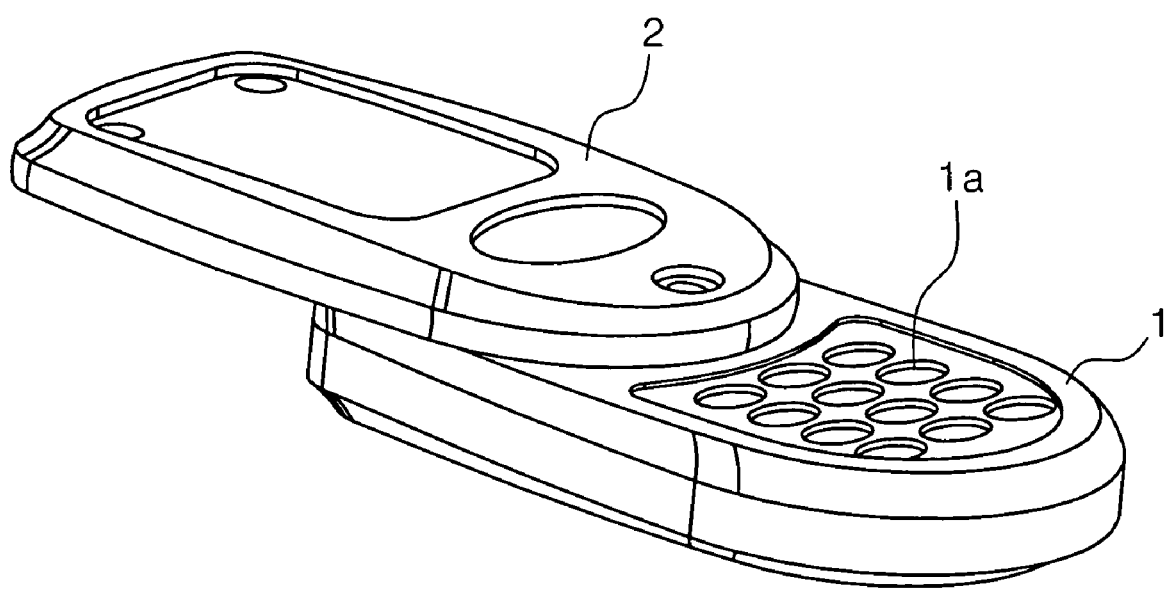
FIG. 1 is a perspective view illustrating an outer construction of a conventional slide type cellular phone.
Figure 2:
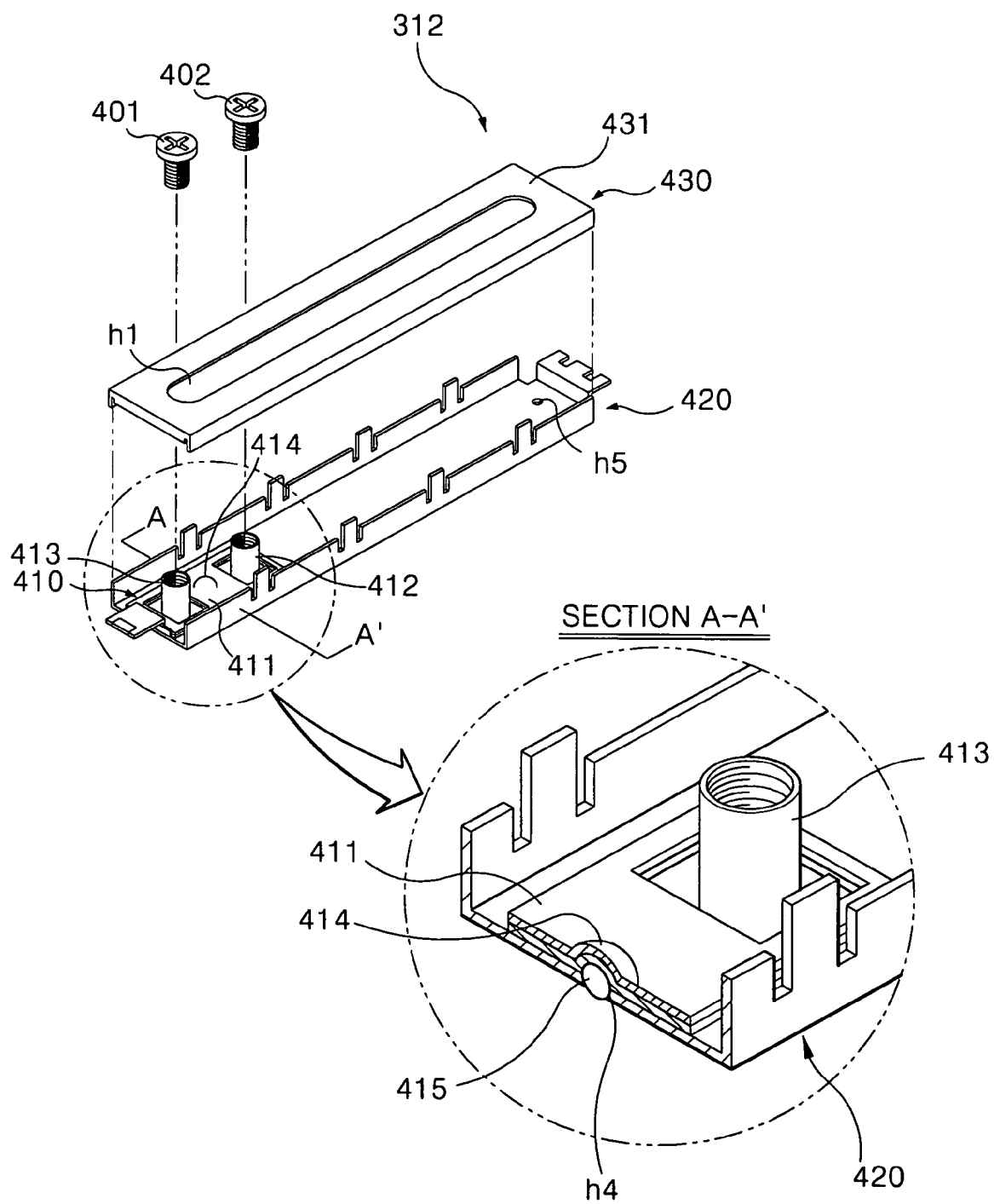
FIG. 2 is a perspective view illustrating a slide module of a conventional slide type cellular phone.
Figure 3:
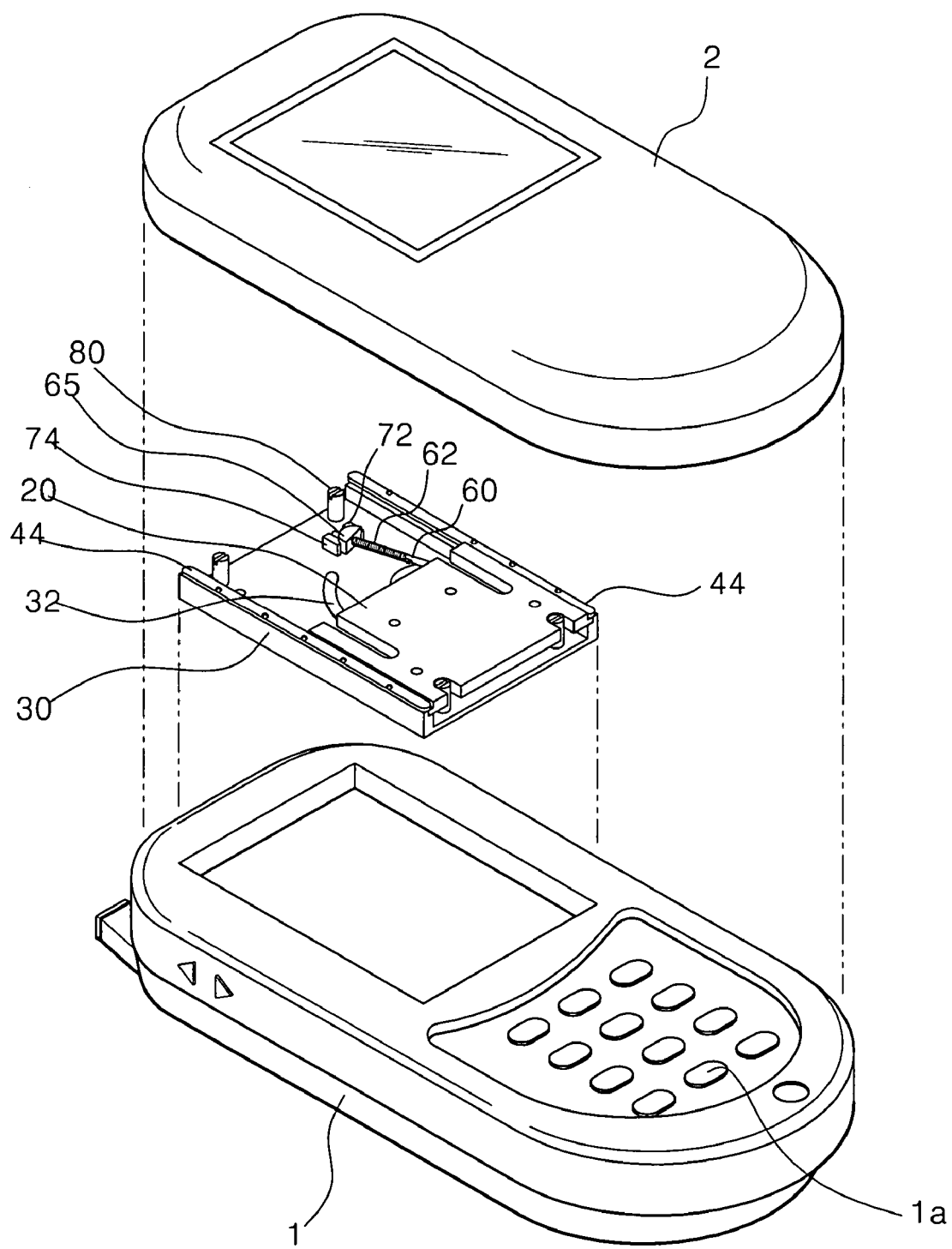
FIG. 3 is a disassembled perspective view illustrating a cover opening and closing apparatus of a cellular phone according to a first embodiment of the present invention.
Figure 4:
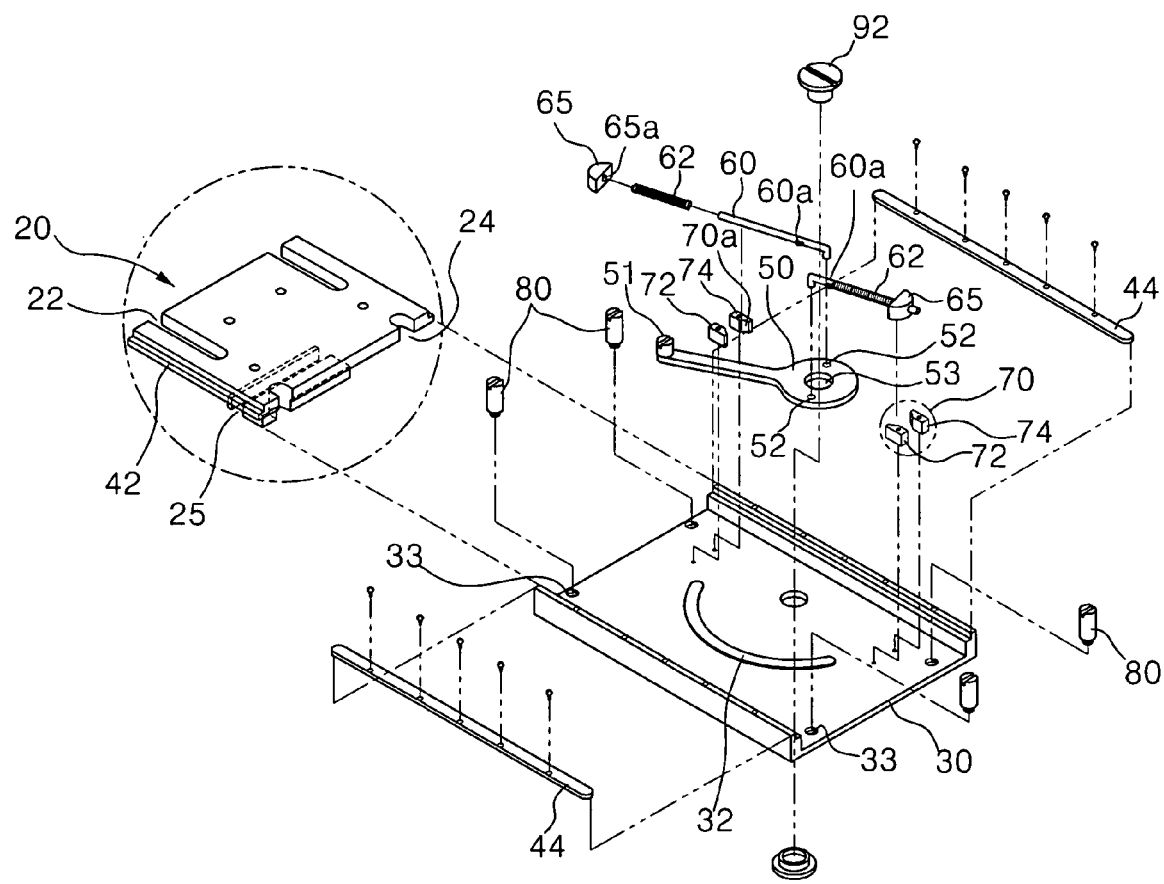
FIG. 4 is a disassembled perspective view illustrating a cover opening and closing apparatus of FIG. 3.
Figure 5:
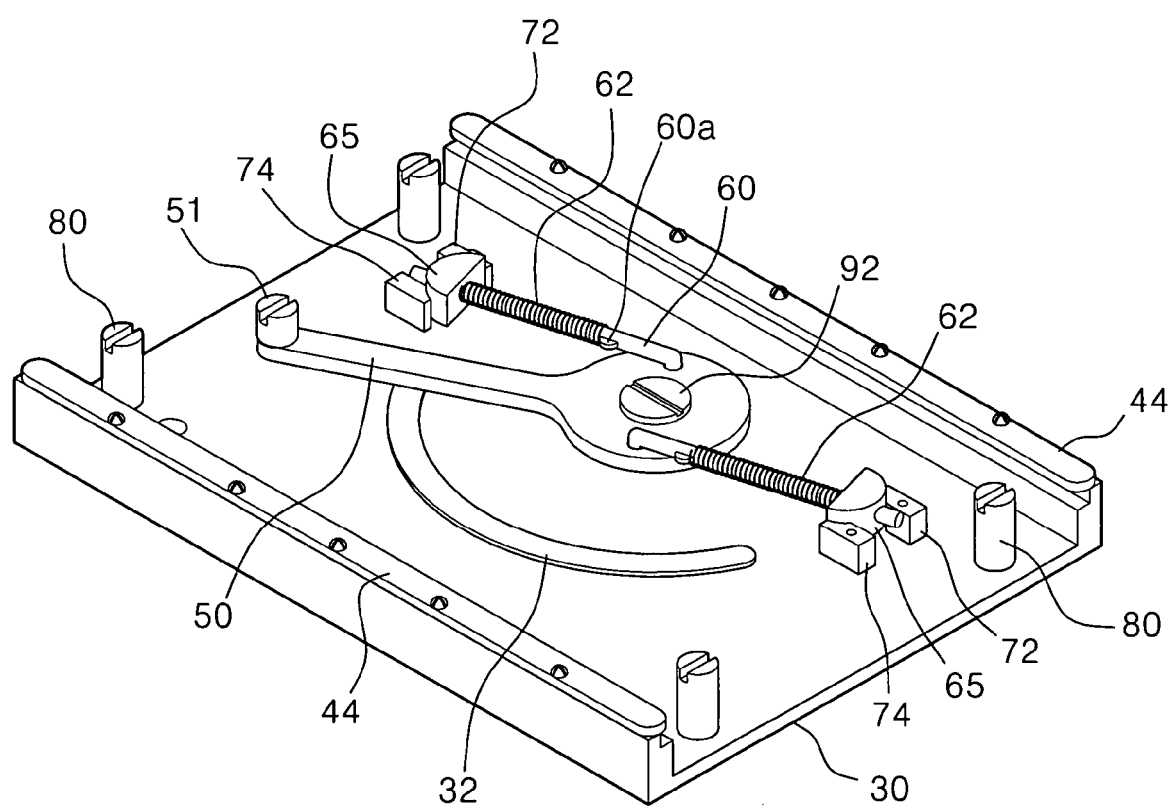
FIG. 5 is a perspective view illustrating a state that an upper plate is separated from a lower plate of FIG. 3.

As shown in FIGS. 3 through 6, a cover opening and closing apparatus of a cellular phone according to a first embodiment of the present invention includes a body 1 having a keypad 1A, a cover 2 engaged to the body 1 slidably in forward and backward directions and having a LCD (Liquid Crystal Display) panel, and a lower plate 30 engaged to an upper side of the body 1.

There are provided an upper plate 20 slidably accommodated in the lower plate 30 and engaged to a bottom surface of the cover 2, and a groove 25 formed in a bottom surface of the upper plate 20 vertically with respect to a moving direction of the upper plate 20.

There is provided a rotation plate 50 having one end having an engaging member 51 slidable in the interior of the groove 25, and the other end rotatably engaged to a bottom surface of the lower plate 30.

A hollow hole 53 is formed in the center of the rotation plate 50, and an engaging member 92 adapted to fix the rotation plate 50 to the lower plate 30 is engaged to the hollow hole 53. A through hole 52 to which one end of a cooperating bar 60 is engaged is formed near the hollow hole 53.

There are further provided a pair of cooperating bars 60 each having one end engaged to the rotation plate 50, and the other end movably supported b the upper surface of the lower plate 30 wherein the cooperating bars 60 cooperate each other when the rotation plate 50 is rotated. A spring member 62 is engaged to an outer lateral surface of the cooperating bar 60 and is contracted and extended when the cooperating bar 60 is moved.

There is provided a fixing protrusion 60a at both sides of an external surface of the cooperating bar 60 for preventing an escape of the spring member 62.

A fixing unit 70 includes a support plate 65, and first and second fixing pieces 72 and 74. The support plate 65 is fixed to the other end of the cooperating bar 60 and is adapted to prevent an escape of the spring member 62 and is formed in an outer surface in a circular shape. The first and second fixing pieces 72 and 74 are engaged on the upper surface of the lower plate opposite to each other. A support surface 70a surface-contacting with the outer surface of the support plate 65 is opposite to each of the first and second fixing pieces 72 and 74.

As a stopper unit adapted to limit a sliding movement of the upper plate 20, an engaging groove 22 and a fixing groove 24 are provided at both sides in the forward and backward portions of the upper plate 20. A stopper 80 is engaged to the engaging hole 33 of the lower plate 30 and is adapted to limit the movement of the upper plate 20 in such a manner that the engaging groove 22 is engaged with the fixing groove 24.

A flange portion 42 is formed on the left and right surfaces of the upper plate 20. A guide rail 44 is provided in the lower plate 30 to correspond with the flange portion 42 and is adapted to support the upper plate 20 that is slidably moved.

There is provided a guide shoulder portion 32 protruded from a bottom surface of the lower plate 30 and adapted to separate the rotation plate 50 from the lower plate 30 for thereby implementing a smooth rotation.

The guide rail 44 of the lower plate 30 is injected in an integral structure, and is engaged by a bolt, etc. in an integral type.

The operation of the cover opening and closing apparatus of a cellular phone according to a first embodiment of the present invention will be described with reference to the accompanying drawings.

When a user pushes the cover 2 in the forward direction of the body 1, the flange portion 42 of the upper plate 20 engaged to the cover 2 is slid in the forward direction along the guide rail 44 of the lower plate 30.

The engaging member 51 accommodated in the groove 25 of the upper plate 20 is slid in the vertical direction with respect to the moving direction of the upper plate 20 in the interior of the groove 25. The rotation plate 50 is rotated in the clockwise direction along the guide shoulder portion 32 with respect to the engaging member 92 engaged to the bottom surface of the lower plate 30 at the central shaft (shown in FIG. 6A).

Figure 6A:
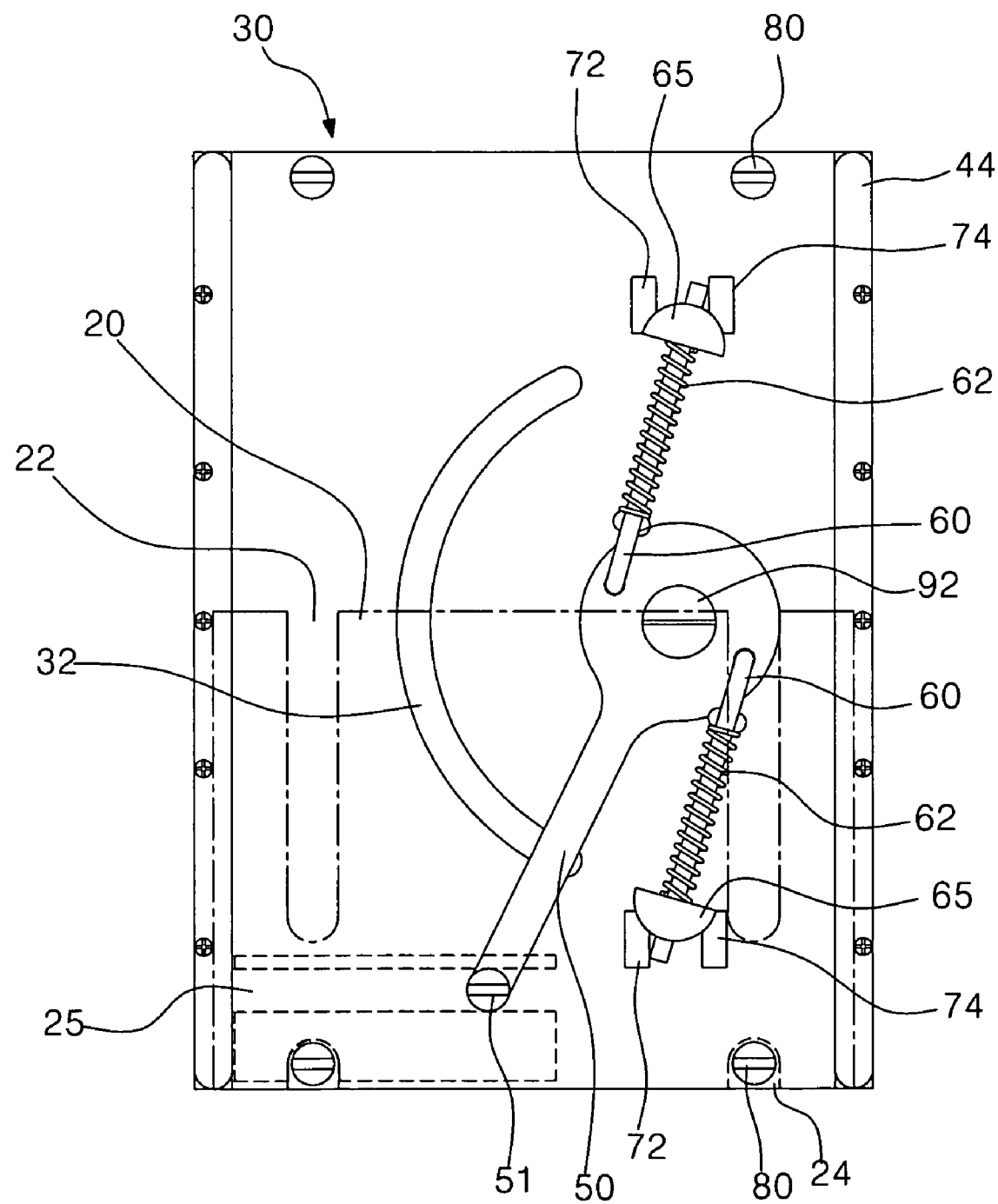
FIG. 6A is a view illustrating a state that an upper plate of FIG. 3 is engaged to a lower plate.
Figure 6B:
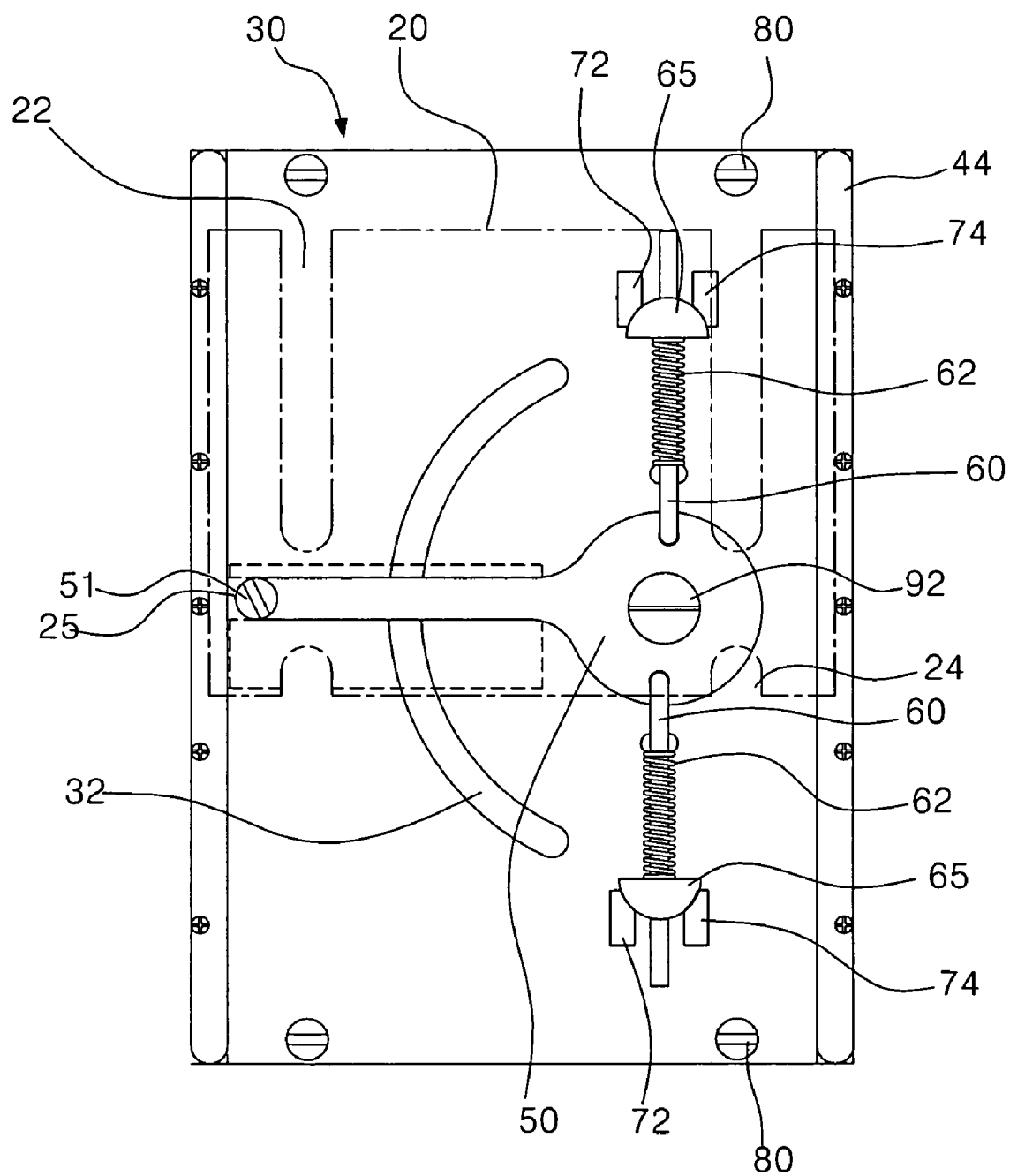
FIG. 6B is a view illustrating a state that an upper plate of FIG. 3 is slid in a forward direction of a lower plate.

As shown in FIG. 6B, in the case that the upper plate 20 is slid to the intermediate portion of the lower plate 30 based on the rotation of the rotation plate 50, the engaging member 51 of the rotation plate 50 is positioned at the other side (outer side in the drawing) of the groove 25. At this time, the spring member 62 engaged to the outer side of the cooperating bar 60 is positioned at the most contracted portion.

Namely, a pair of the cooperating bars 60 cooperating based on the rotation of the rotation plate 50 maintain upper and lower directions shown in FIG. 6B, so that the spring member 62 connected with one side of the cooperating bar 60 is contracted, and the spring member connected with the other side of the cooperating bar 60 is extended based on a counteraction operation.

The support plate 65 is rotated in the counterclockwise direction on the support surface 70a and is tilted at the time when one side the cooperating bar 60 is contracted and is moved away from the elastic force of the spring member 62 (when the cooperating bar 60 is moved to the intermediate portion of the upper plate as shown in FIG. 6B). Thereafter, the spring member 62 is extended again.

On the contrary, the other side of the cooperating bar 60 is contracted when the spring member 62 is extended, and the upper plate 20 is moved to the intermediate position when the upper plate 20 is slidably moved, and the other side of the cooperating bar 60 is extended when it is moved away from the maximum contraction position based on the counteraction operation.

When the upper plate 20 is slidably moved, a sliding movement is performed with a small resistance by the elastic force of the spring member 62. When the upper plate 20 is out of the maximum contraction range, the upper plate 20 is slidably moved smoothly by the elastic force and inertial force. Therefore, the opening and closing operation of the cover 2 can be precisely recognized by the user.

Figure 6C:
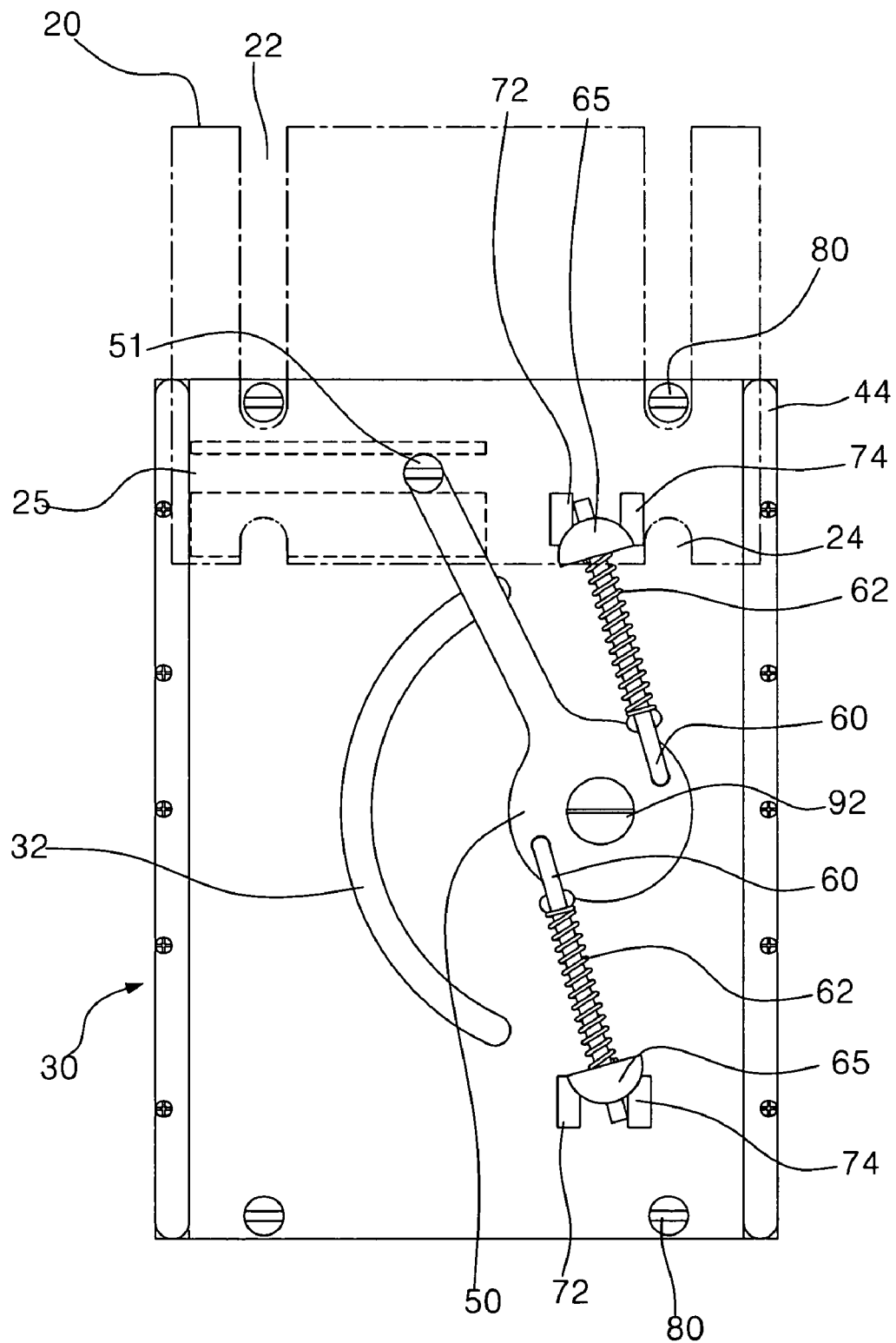
FIG. 6C is a view illustrating a state that an upper plate of FIG. 3 is slid with respect to a lower plate.
Figure 7:
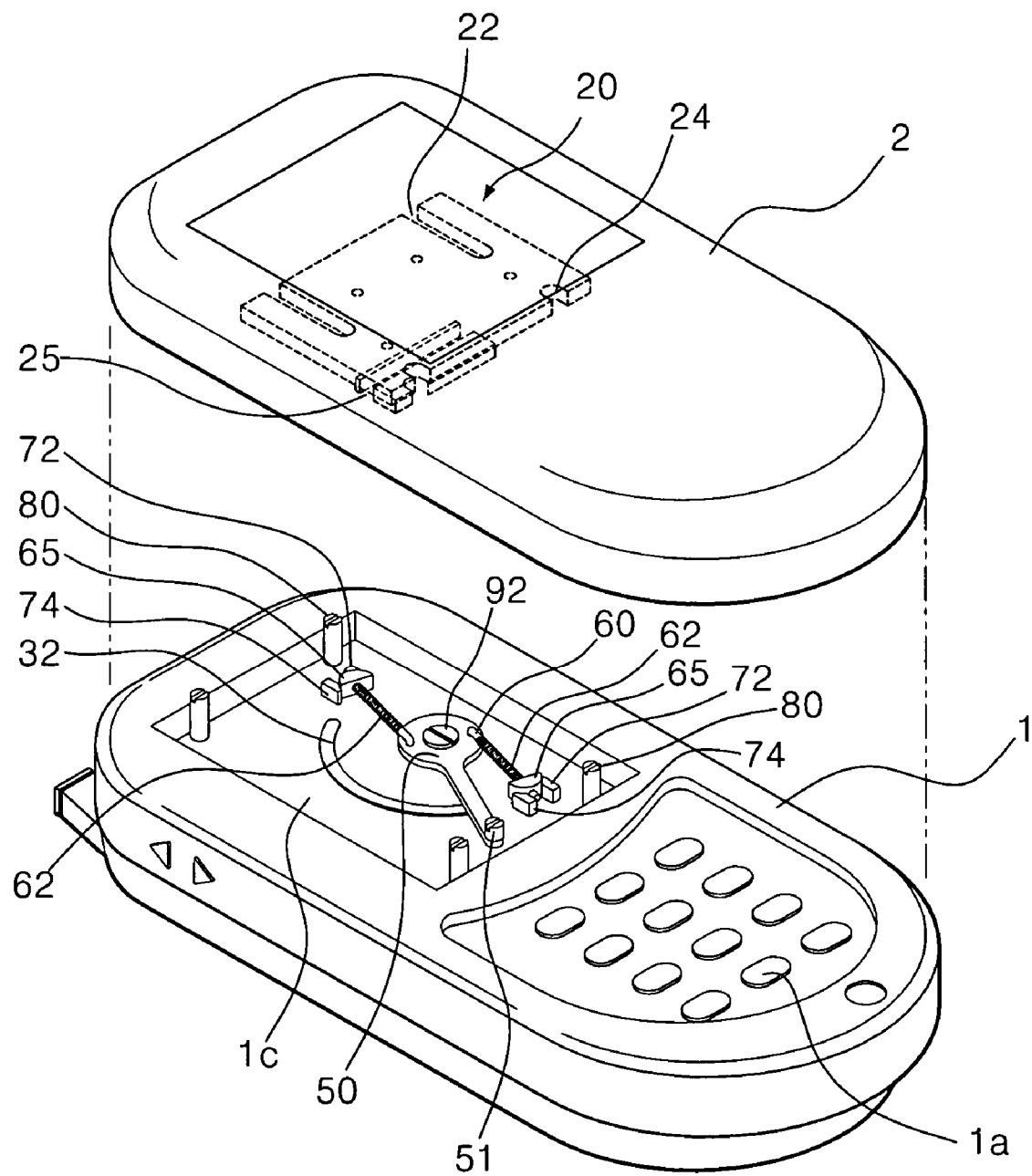
FIG. 7 is a disassembled perspective view illustrating a cover opening and closing apparatus of a cellular phone according to a second embodiment of the present invention.
Figure 8:
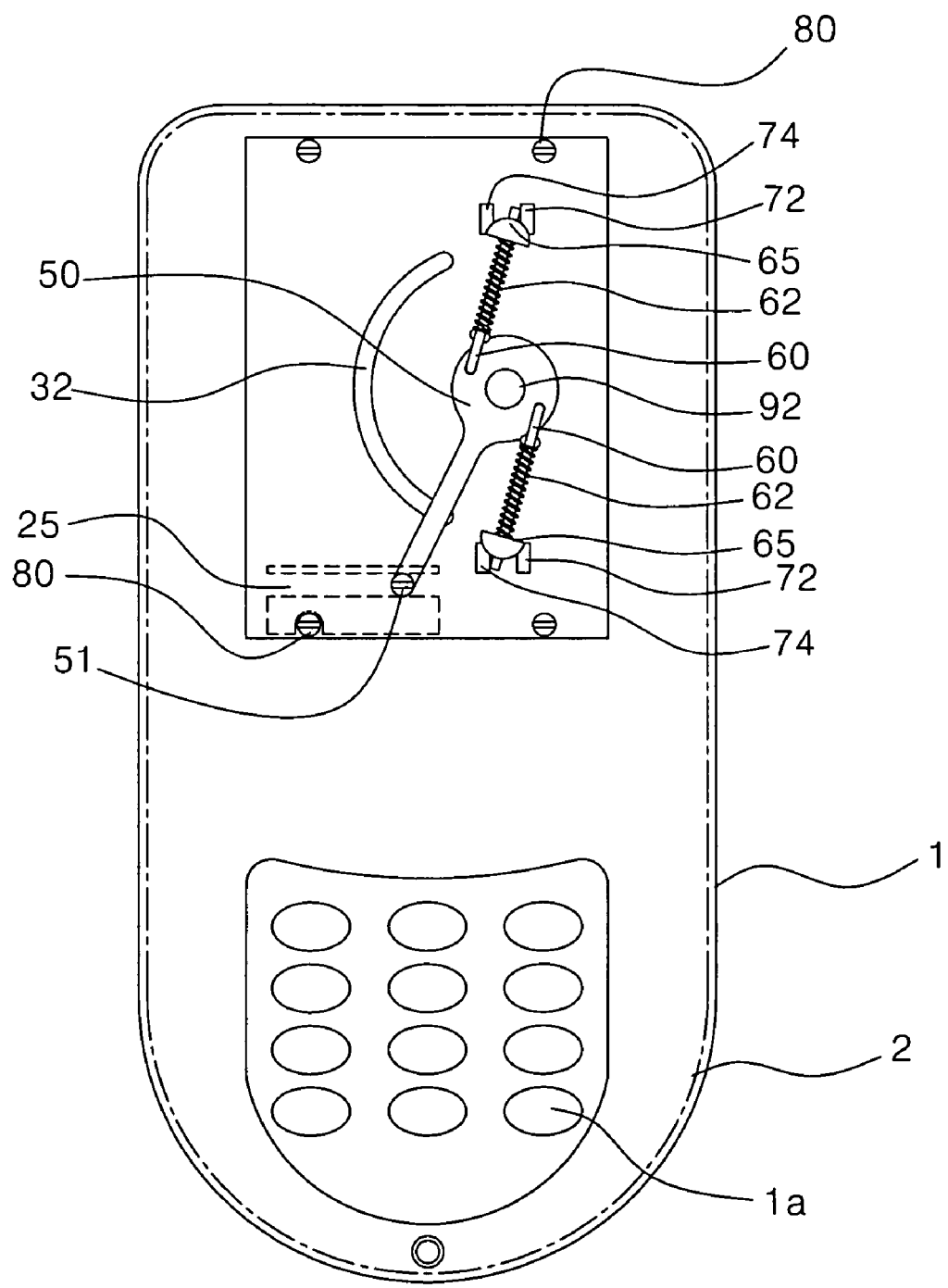
FIG. 8 is a view illustrating a state that a cover is engaged to a body of FIG. 7.

As shown in FIGS. 6A and 6C, when the upper plate 20 is slidably moved and is positioned at a certain position, since the engaging groove 22 or the fixing groove 24 are engaged with the stopper 80, the sliding movement of the upper plate 20 is limited.

In addition, the operation that the cover 2 is closed with respect to the body 1 is performed based on the sequence reverse to the opening sequence of the cover 2. Therefore, the detailed operation is omitted. The cooperation bar 60 and the rotation plate 50 are returned to the original positions.

[Second Embodiment]

As shown in FIGS. 7 through 10, the cover opening and closing apparatus of a cellular phone according to a second embodiment of the present invention includes a body 1 having a keypad 1a, a cover 2 slidably engaged to the body 1 and having a display panel, a rotation plate 50 rotatably engaged to an engaging groove 1c formed in an upper surface of the body 1 and slidably moving the cover 2 in forward and backward directions with respect to the body 1, an elastic support unit having one end fixed to the rotation plate 50 and the other end movably supported by the bottom surface of the engaging groove 1c and adapted to elastically support the rotation plate 50 when the cover 2 is slidably moved, and a stopper unit formed in the body 1 and the cover 2 and limiting a sliding movement of the cover 2 being opened and closed with respect to the body 2.

At this time, the constructions of the second embodiment of the present invention are the same as the fist embodiment of the present invention except for the following constructions. Namely, the rotation plate 50, a pair of cooperation bars 60 and stopper 80 are directly engaged to the engaging groove 1c formed in an upper surface of the body. In addition, the concave 25, the engaging groove 22 and the fixing groove 24 are directly formed in the inner surface of the cover 2. Therefore, the detailed descriptions thereof will be omitted. The same elements as the first embodiment of the present invention will be given the same reference numerals.

Figure 9:
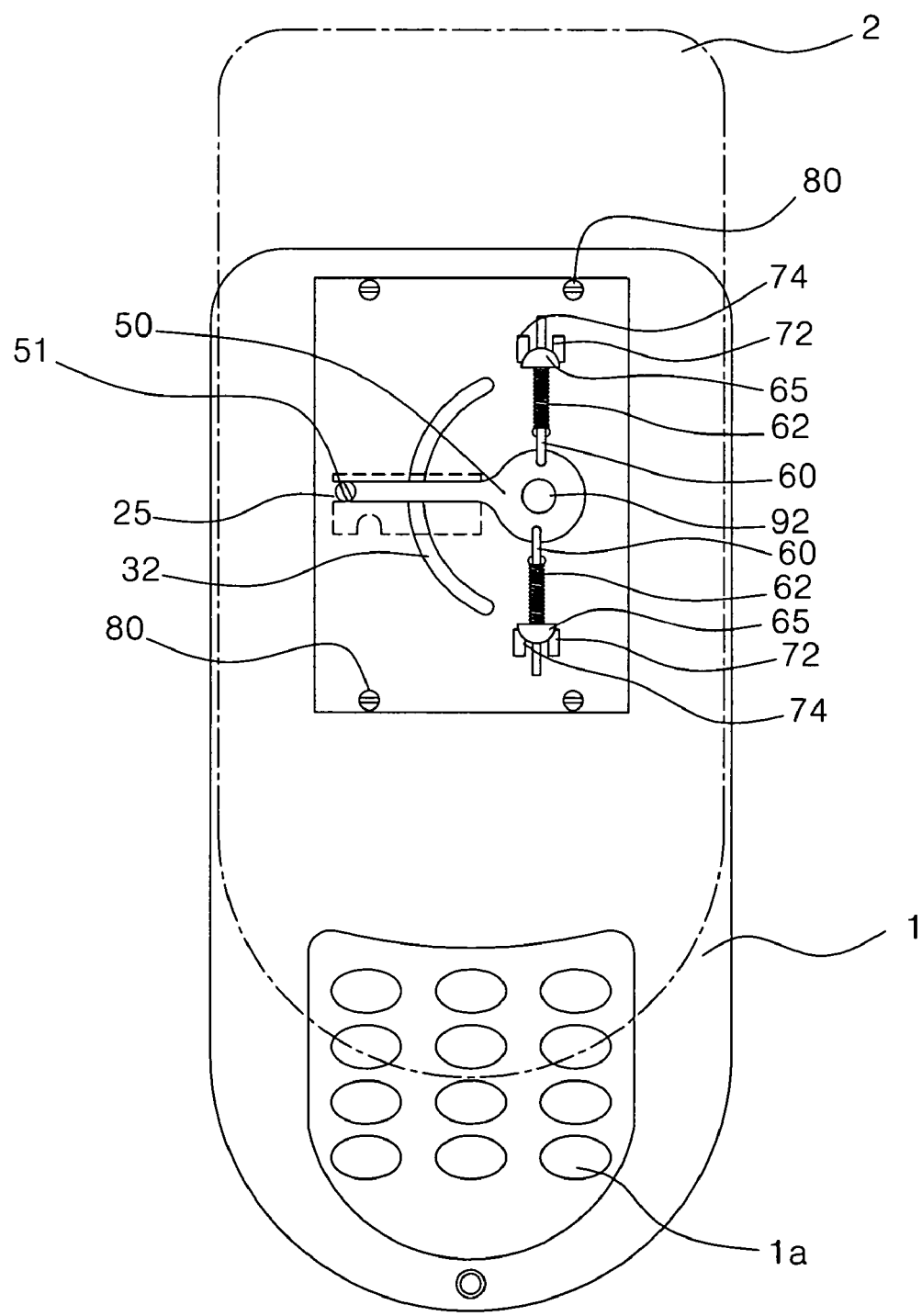
FIG. 9 is a view illustrating a state that a cover of FIG. 7 is moved in a forward direction of a body.
Figure 10:
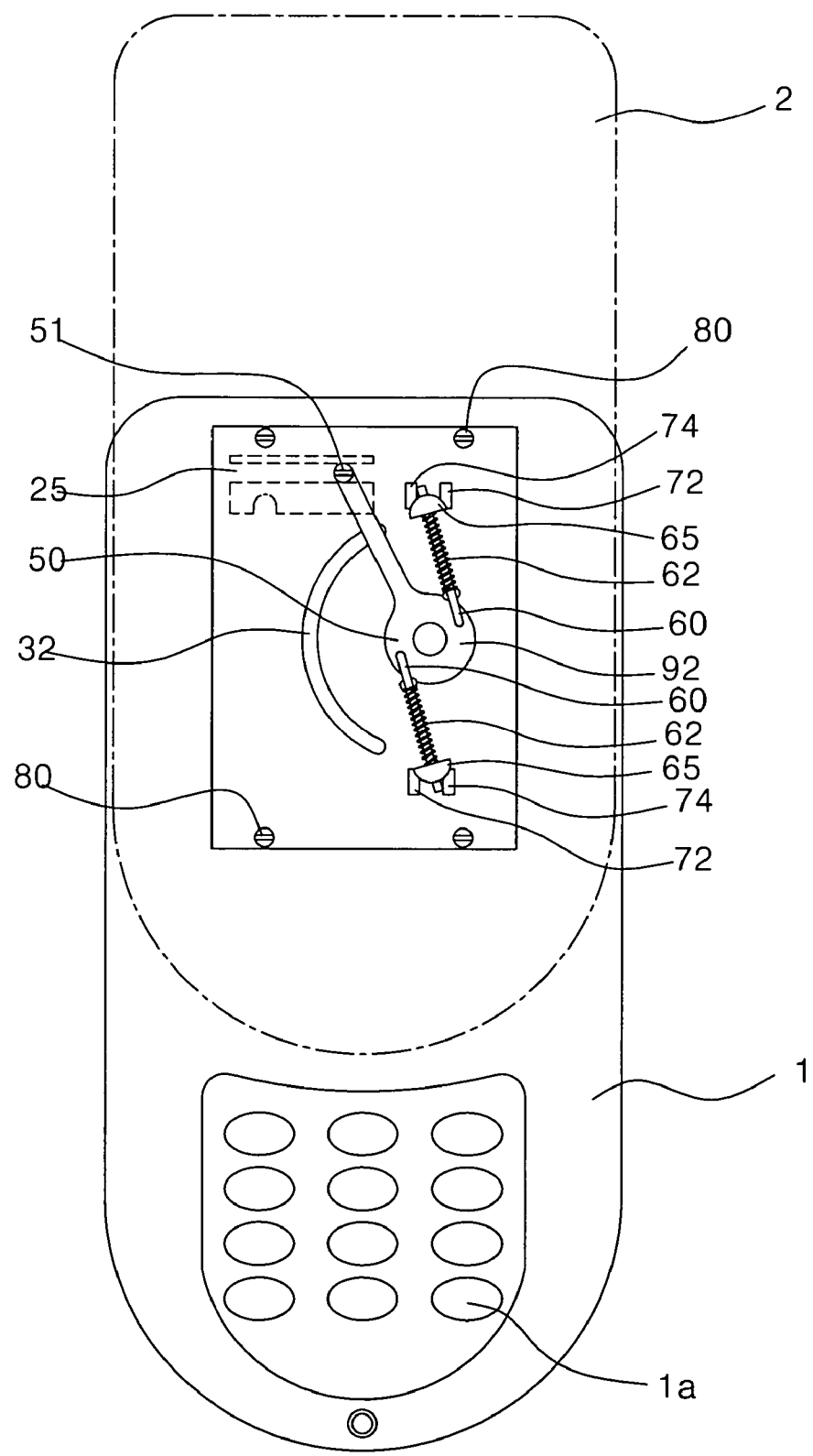
FIG. 10 is a view illustrating a state that a cover of FIG. 7 is slid with respect to a body.

As shown in FIGS. 9 and 10, when the cover 2 is pushed with respect to the body 1 in the forward direction, the rotation plate 50 formed in the engaging groove 1c of the body 1 is rotated in the counterclockwise direction with respect to the engaging member 92.

Therefore, the engaging member 51 of the rotation plate 50 is slidably moved along the groove 25 formed in the inner surface of the cover 2, so that the cover 2 is slidably moved with respect to the body 1 in the forward direction.

[Third Embodiment]

As shown in FIGS. 11 through 15, the cover opening and closing apparatus of a cellular phone according to a third embodiment of the present invention includes a body 1 having a keypad 1a, a cover 2 engaged slidably in forward and backward directions having a display panel, an upper plate engaged to a lower surface of the cover 2 and having a first gear 27 (for example, a rack gear) on a bottom surface, a lower plate 30 engaged to an upper side of the body 1 wherein the upper plate 20 is slisably engaged to the lower plate 30, and a second gear 55 (for example, pinion gear) engaged with the first gear 27 is rotatably engaged to the lower plate, a support unit having one end fixed to the second gear 55 and the other end movably supported by an upper surface of the lower plate 30 wherein the support unit elastically support the second gear 55 when the upper plate 20 is slidably moved, and a stopper unit provided in the upper and lower plates 20 and 30 and adapted to limit a sliding movement of the upper plate 20 with respect to the lower plate 30.

Figure 14:
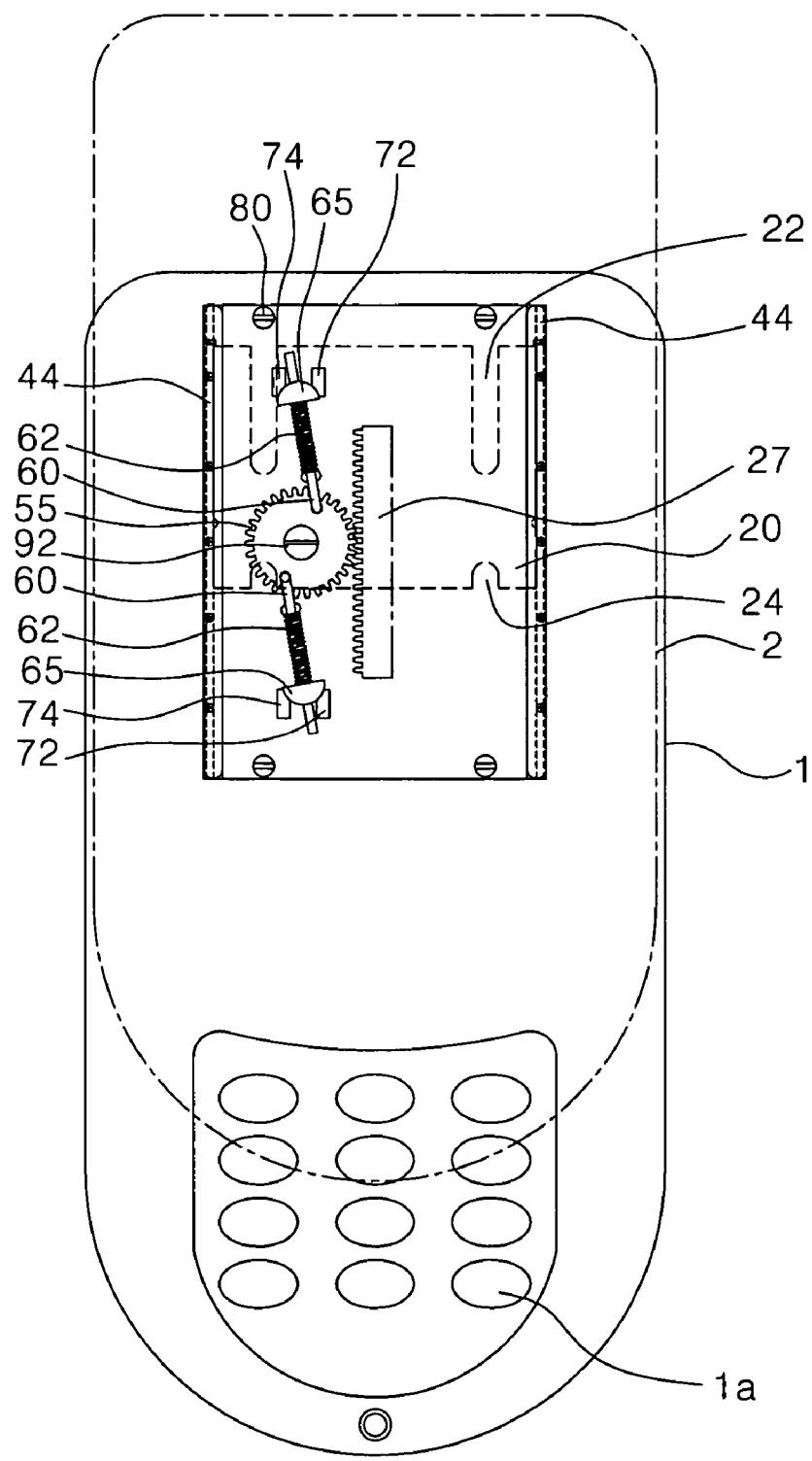
FIG. 14 is a view illustrating a state that a cover of FIG. 11 is moved in a forward direction with respect to a body.
Figure 15:
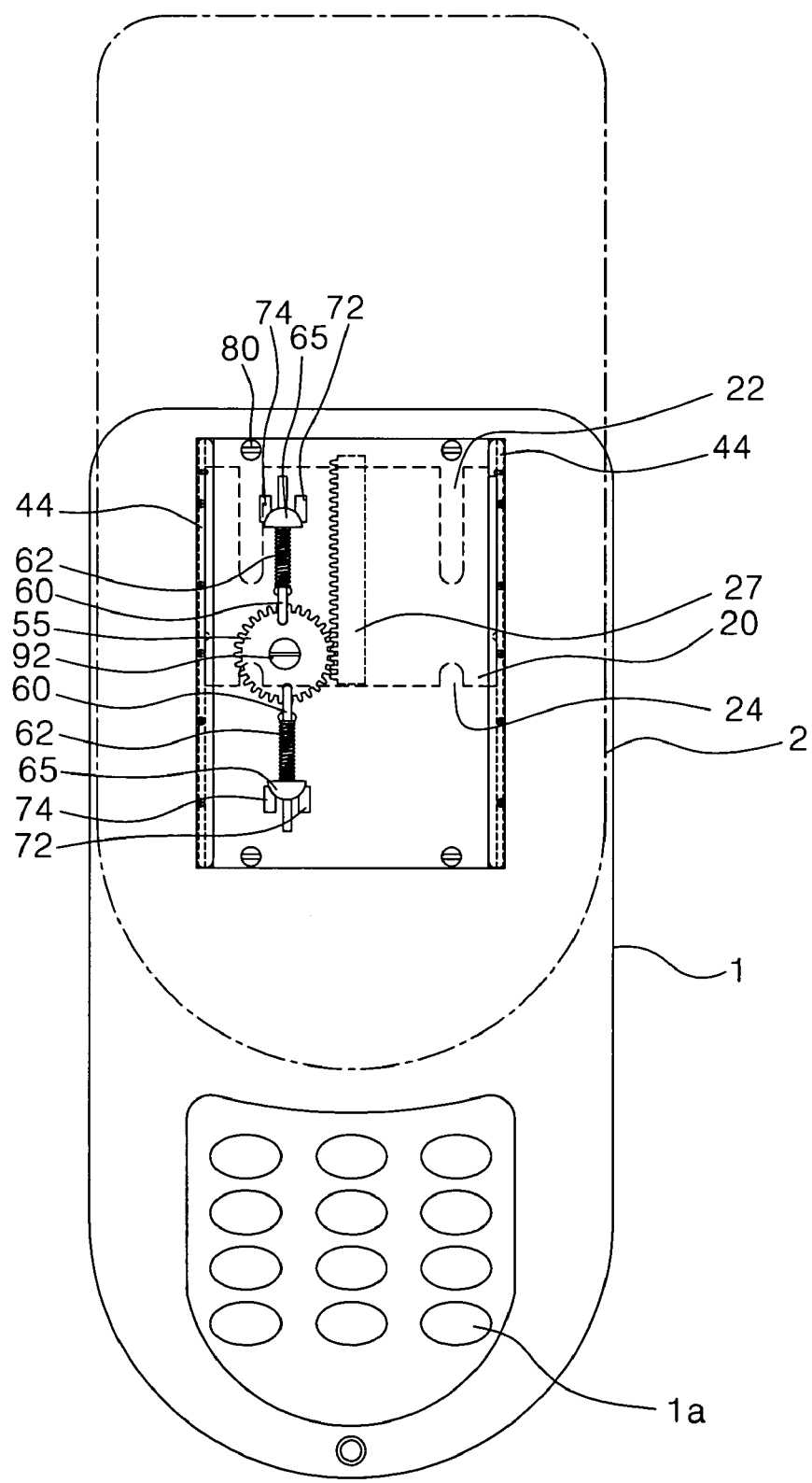
FIG. 15 is a view illustrating a state that a cover of FIG. 11 is slid with respect to a body.
Figure 16:
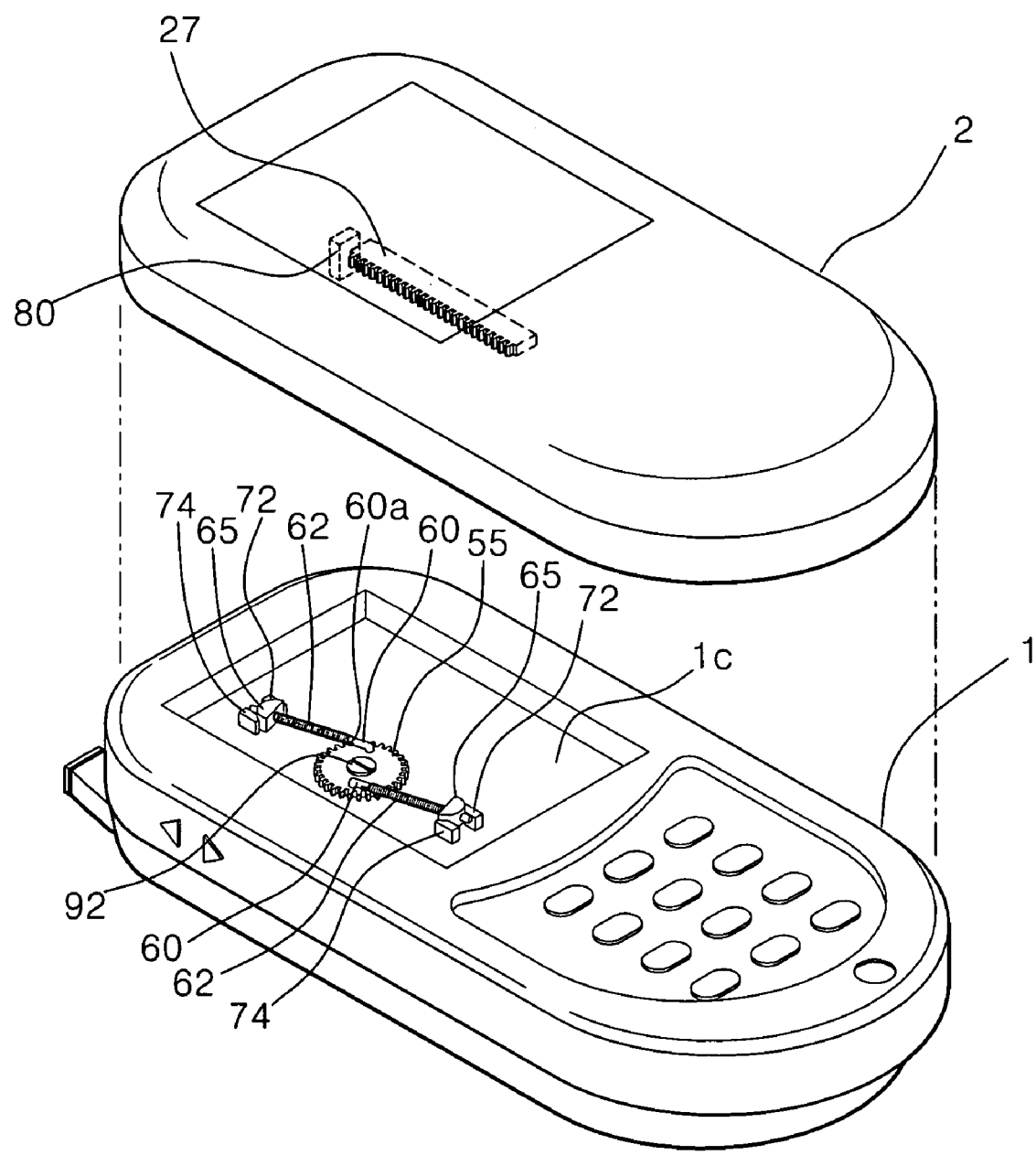
FIG. 16 is a disassembled perspective view illustrating a cover opening and closing apparatus of a cellular phone according to a fourth embodiment of the present invention.
Figure 17:
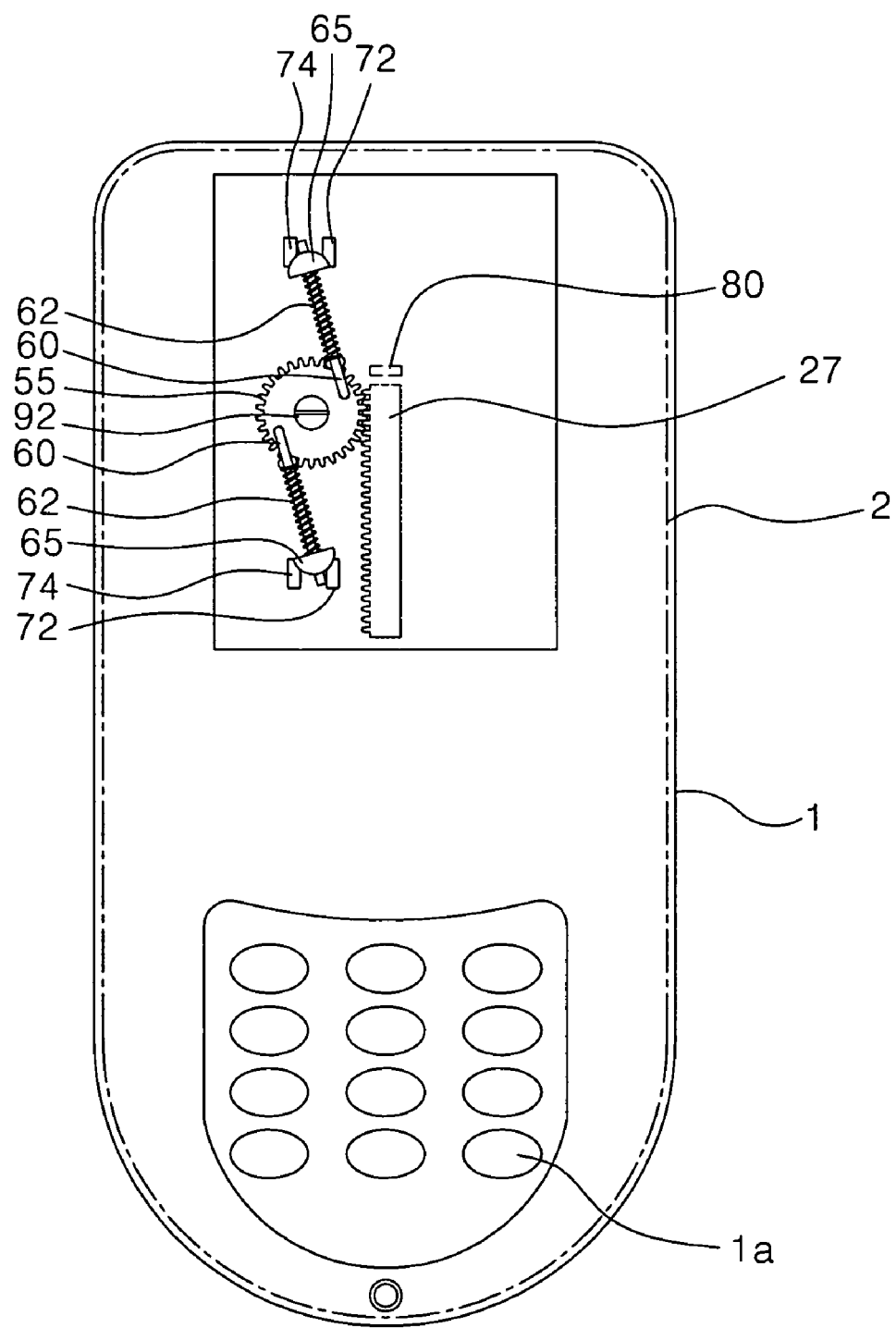
FIG. 17 is a view illustrating a state that a cover of FIG. 16 is engaged to a body.

As shown in FIGS. 14 and 15, as the cover 2 is slidably moved in the forward direction with respect to the body 1, the first gear 27 engaged to a bottom surface of the upper plate 20 engaged to an inner surface of the cover 2 is moved in the forward direction (shown in the drawing) based on the rotation of the second gear 55 engaged to an upper surface of the lower plate 30 engaged to the upper side of the body 1.

Therefore, the cover 2 is slidably moved with respect to the body 1 and is opened.

Here, the constructions of the third embodiment of the present invention are the same as the first embodiment of the present invention except for the constructions that the first gear 27 is formed in an inner surface of the upper plate 20, and the second gear 55 rotatably installed on an upper surface of the lower plate 30 and is engaged with the first gear 27. Therefore, the detailed descriptions thereof will be omitted. The same elements as the first embodiment of the present invention will be given the same reference numerals.

Figure 11:
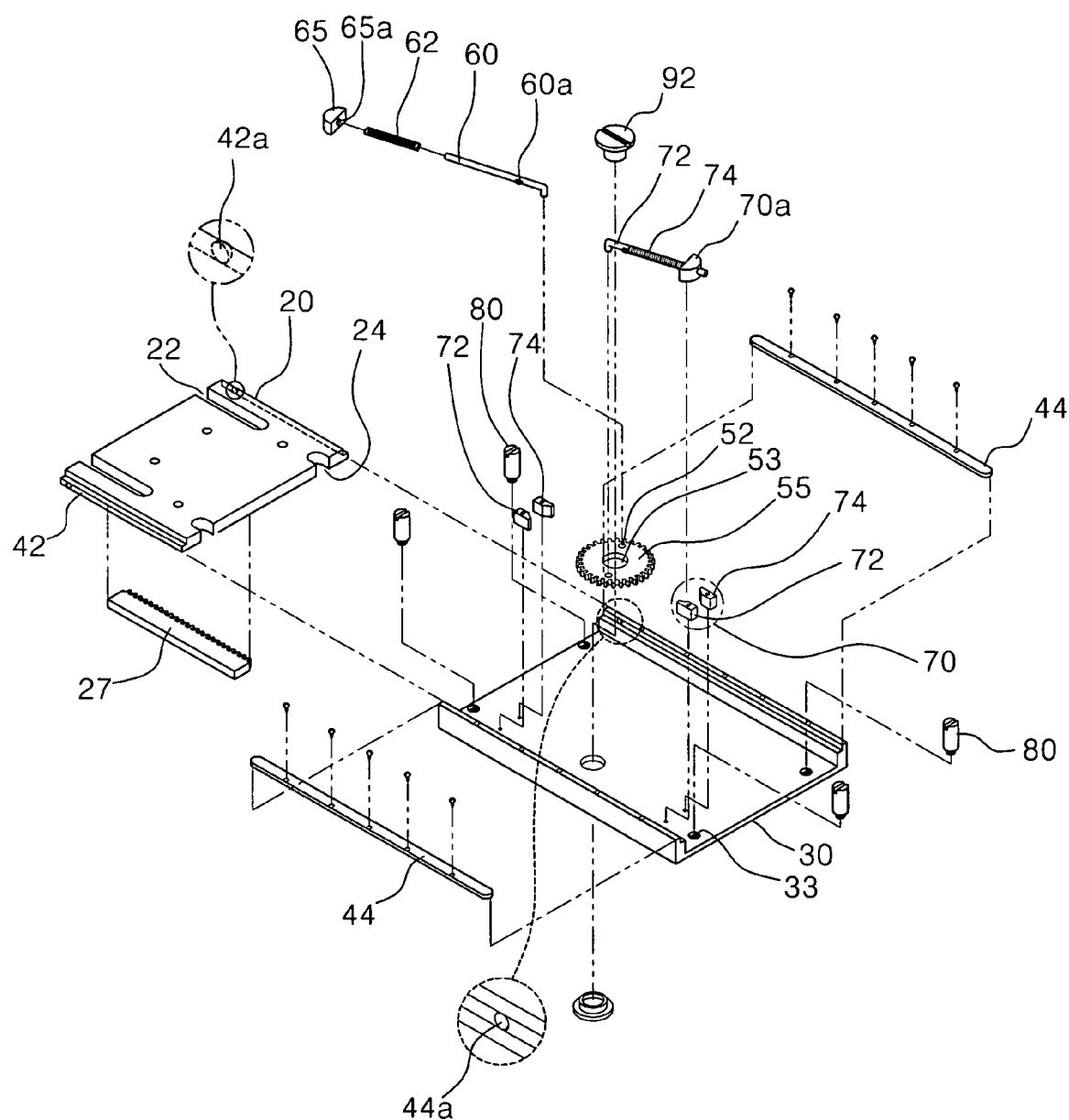
FIG. 11 is a disassembled perspective view illustrating a cover opening and closing apparatus of a cellular phone according to a third embodiment of the present invention.
Figure 12:
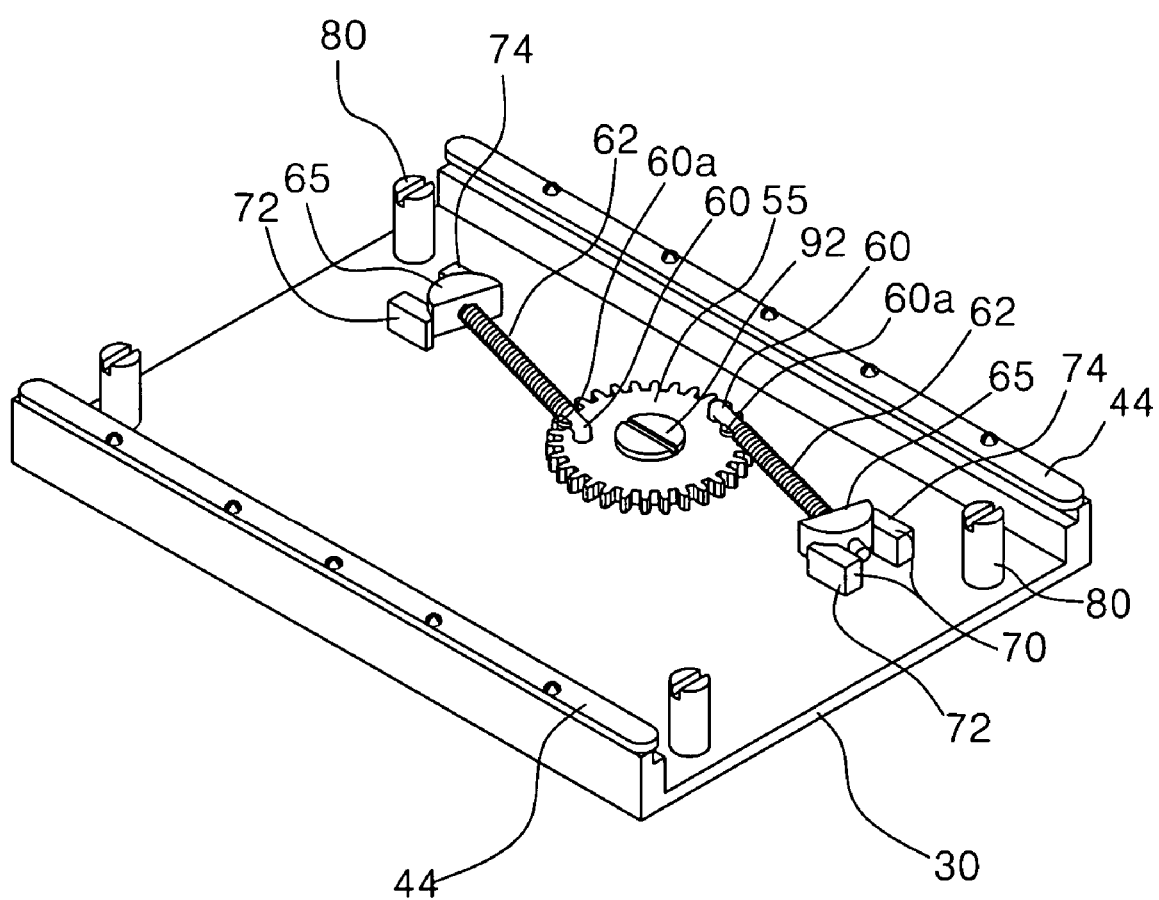
FIG. 12 is a perspective view illustrating a state that an upper plate is separated from a lower plate of FIG. 11.
Figure 13:
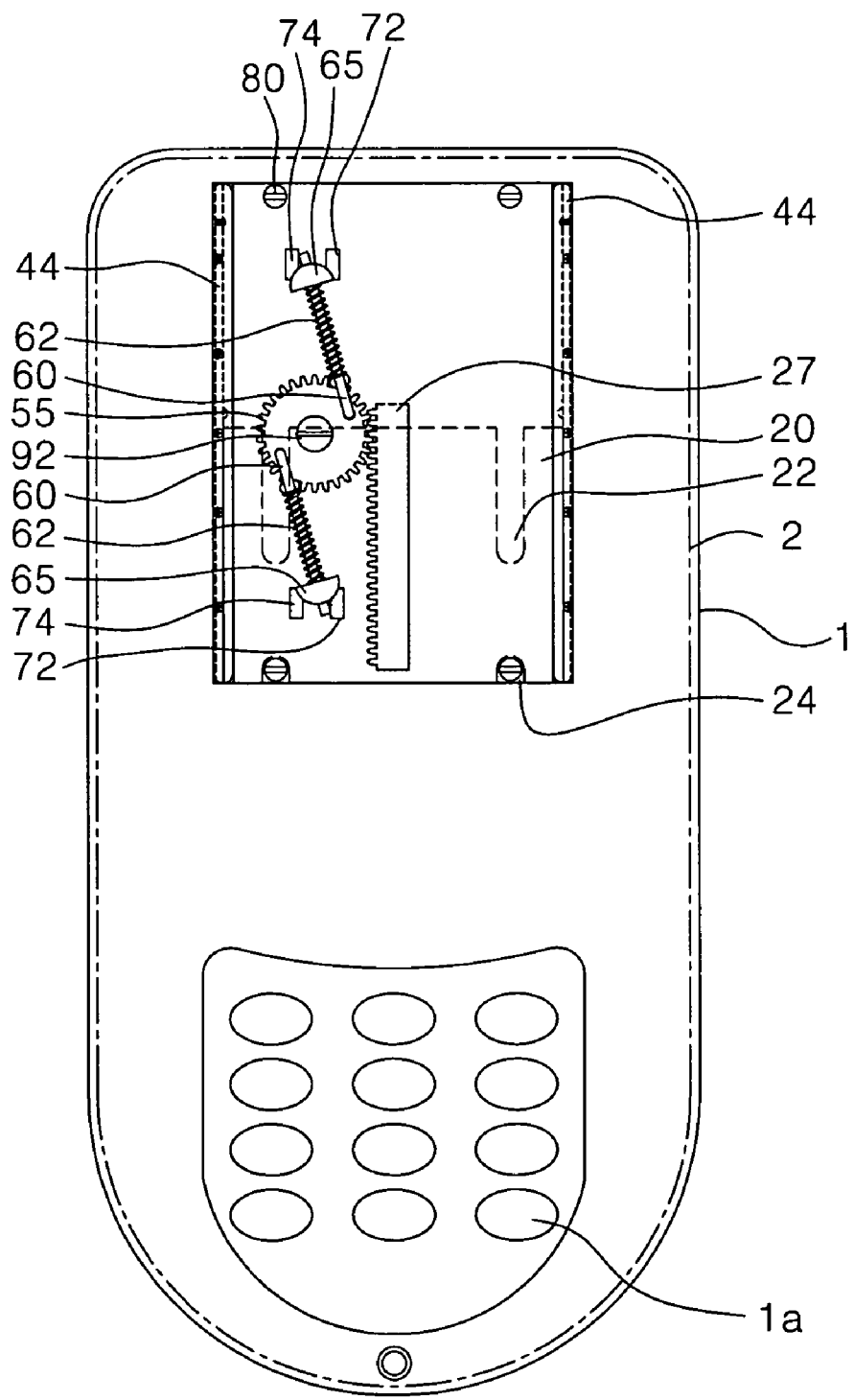
FIG. 13 is a view illustrating a state that an upper plate and a lower plate of FIG. 11 are engaged to a cover and a body, respectively.

As shown in FIG. 11, in the opening and closing apparatus of the cellular phone according to the present invention, the upper plate 20 and the lower plate 30 are fixed by a locking unit, and the locking unit has an engaging protrusion 42a in an outer side of the flange portion 42 of both sides of the upper plate 20, and a locking groove 44a corresponding to the engaging protrusion 42a is formed in an inner surface of the guide rail 44 of the lower plate 30.

When the upper plate 20 is fully pushed, the engaging groove 22 is interfered with the stopper 80, and the engaging protrusion 42a is lock-engaged with the locking groove 44a, so that it is possible to maintain an opened state of the cover 2. Therefore, it is possible to prevent the upper plate 20 from being downwardly moved irrespective of the user's intention after the sliding movement of the upper plate 20 is completed.

When the user closes the cover 2, the cover 2 is downwardly moved using a certain force larger than a locking engagement force used for unlocking the locked engagement between the engaging protrusion 42a and the locking groove 44a, so that the engaging protrusion 42a is escaped from the locking groove 44a for thereby implementing a slidable returning operation.

[Fourth Embodiment]

As shown in FIGS. 16 through 19, the cover opening and closing apparatus of a cellular phone according to the fourth embodiment of the present invention includes a body 1 having a keypad 1a, a cover 2 engaged to the body 1 slidably in forward and back directions and having a display panel, a first gear 27 integrally formed in an inner surface of the cover 2, a second gear 55 rotatably engaged with an engaging groove 1c formed in an upper surface of the body 1, and engaged with the first gear 27, and being slidably moved in forward and backward directions with respect to the body 1, an elastic support unit having one end fixed to the second gear 55, and the other end elastically supported by a bottom surface of the engaging groove 1c and adapted to elastically support the second gear, and a stopper unit formed in a bottom surface of the cover 2 and adapted to limit a slidable movement of the cover 2 with respect to the body 1.

Here, the constructions of the fourth embodiment of the present invention are same as the third embodiment of the present invention except for the construction that the second gear 55, a pair of the cooperating bars 60, and the fixtures 70 are directly engaged to the engaging groove 1c formed on an upper surface of the body 1, and the first gear 27 is directly provided in an inner surface of the cover 2. Therefore, the detailed descriptions thereof will be omitted. The same elements as the third embodiment of the present invention will be given the same reference numerals.

Figure 18:
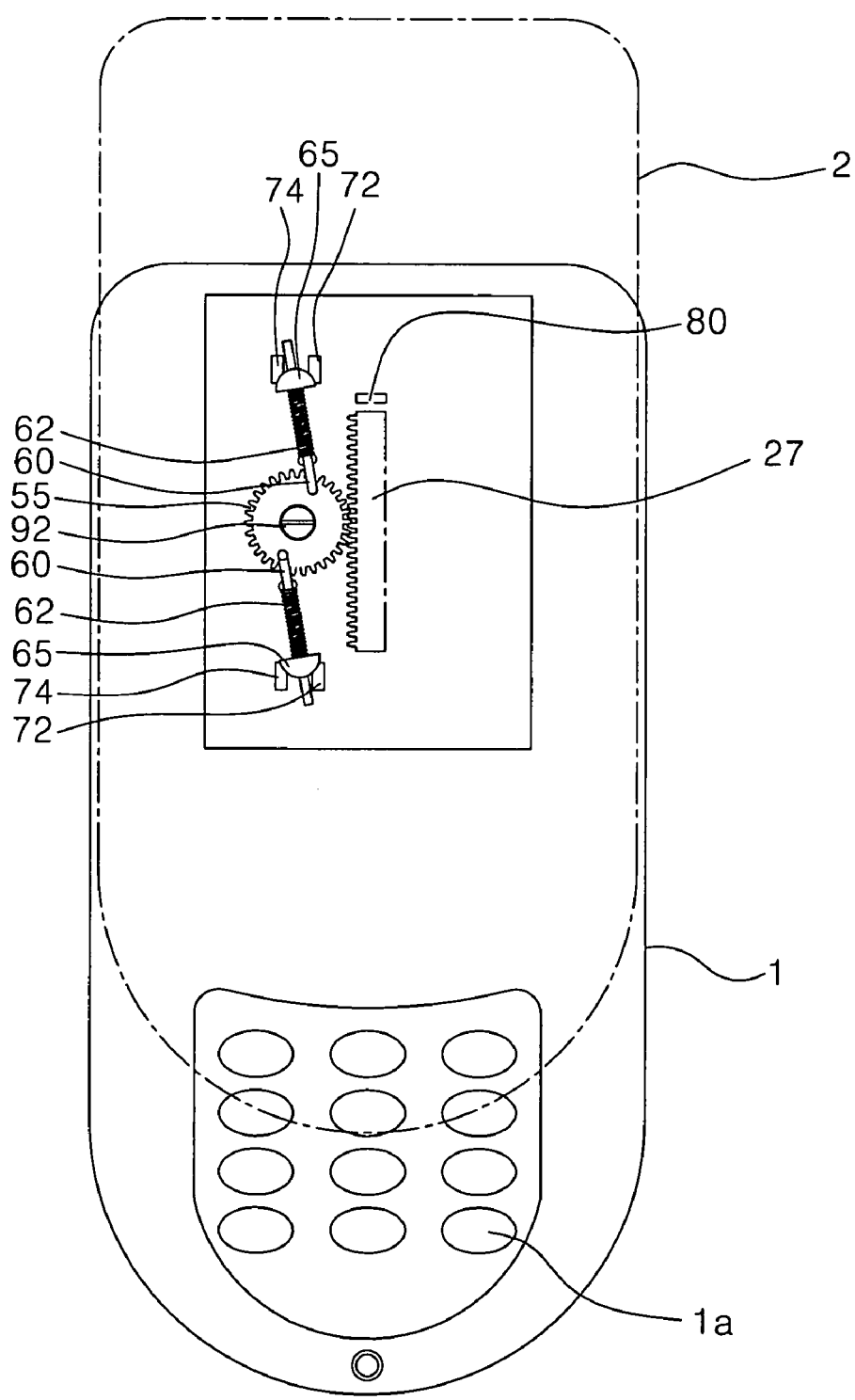
FIG. 18 is a view illustrating a cover of FIG. 16 is slid in a forward direction with respect to a body.
Figure 19:
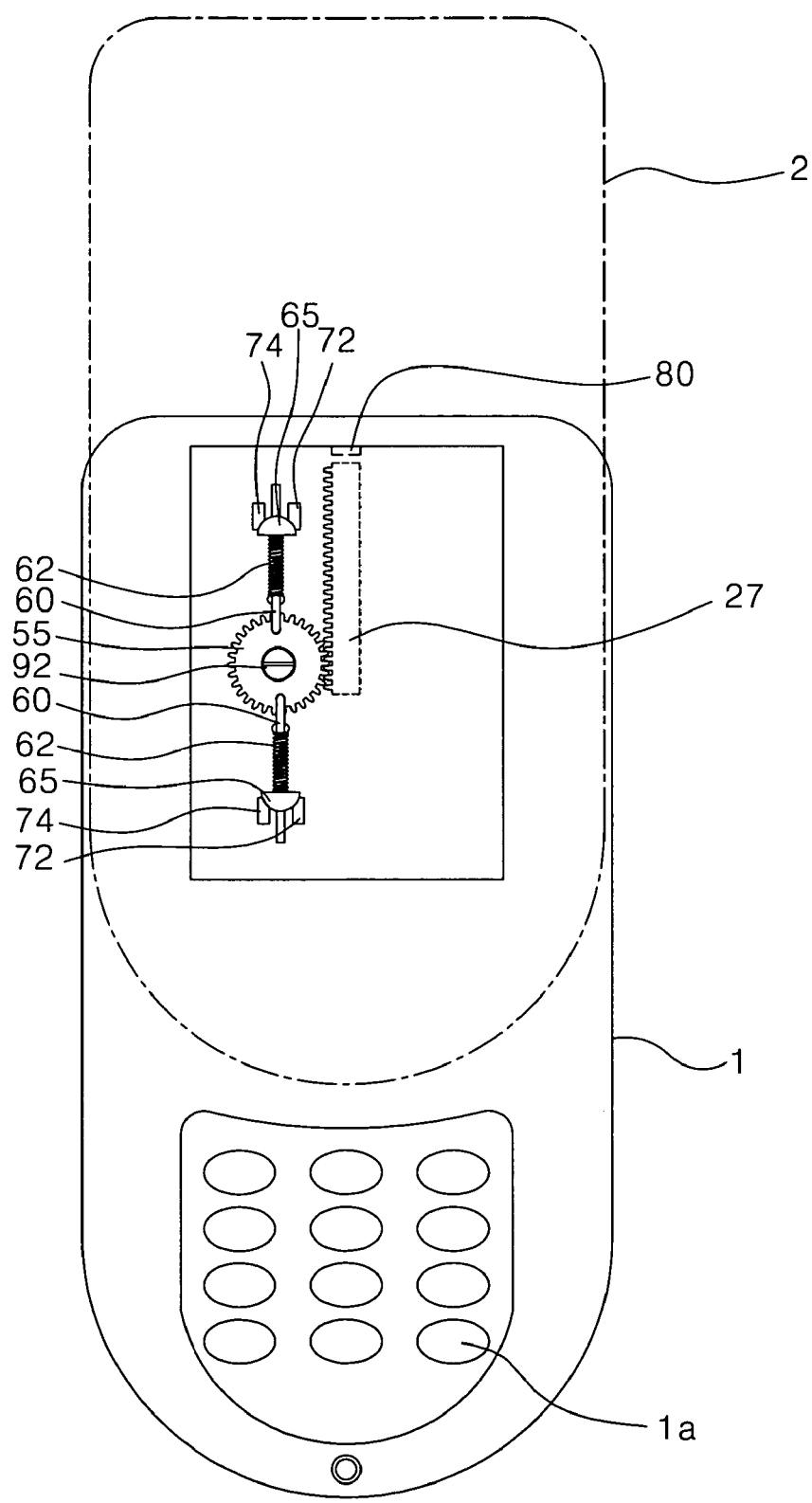
FIG. 19 is a view illustrating a state that a cover of FIG. 16 is slid with respect to a body.

As shown in FIGS. 18 and 19, when the cover 2 is pushed in the forward direction with respect to the body 1, the second gear 55 provided in the engaging groove 1c of the body 1 is rotated in the counterclockwise direction with respect to the engaging member 92 as a central shaft.

Therefore, since the first gear 27 provided in an inner surface of the cover 2 is forwardly moved to engage with the second gear 55, the cover 2 is slidably moved in the forward direction with respect to the body 1.

As described above, the apparatus for opening and closing a cover of a cellular phone according to the present invention has the following advantages.

The slide module of the sliding type cellular phone is formed in a structure using an elastic force of the spring, so that a user can precisely recognize an opening and closing operation of the cover. Since the opening and closing operation of the cover is efficiently performed, it is possible to significantly decrease noises.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for opening and closing a cover of a cellular phone, comprising:
    a body having a keypad;
    a cover being engaged to the body slidably in forward and backward directions and having a display panel;
    an upper plate engaged to a lower side of the cover;
    a lower plate engaged to an upper side of the body, wherein said upper plate is slidably engaged to the lower plate;
    a rotation plate rotatably engaged between the upper and lower plates and adapted to slidably move the upper plate in forward and backward directions with respect to the lower plate;
    an elastic support means having one end fixed to the rotation plate and the other end movably supported by an upper surface of the lower plate, said elastic support means being adapted to elastically support the rotation plate when the upper plate is slidably moved; and
    a stopper means provided in the upper and lower plates and adapted to limit a slidable movement of the upper plate with respect to the lower plate.

2. An apparatus for opening and closing a cover of a cellular phone, comprising:
    a body having a keypad;
    a cover engaged to the body slidably in forward and backward directions and having a display panel;
    a rotation plate rotatably engaged to an engaging groove formed in an upper surface of the body and adapted to slidably move the cover in forward and backward directions with respect to the body;
    an elastic support means having one end fixed to the rotation plate and the other end movably supported by a bottom surface of the engaging groove, said elastic support means being adapted to elastically support the rotation plate when the upper plate is slidably moved; and
    a stopper means provided in the body and the cover, respectively, and adapted to limit a slidable movement of the cover being opened and closed with respect to the body.

3. The apparatus of claim 1, wherein said elastic support means includes:
    a pair of cooperation bars each having one end engaged to the rotation plate, respectively, and cooperating with each other when the rotation plate is rotated;
    a spring member engaged to an outer surface of the cooperation bars and being contracted and extended when the cooperation bars are moved;
    a support piece fixed to the other ends of the cooperation bars wherein an outer surface of the support piece is formed in a circular shape; and
    a fixture engaged to be opposite to the upper surface of the lower plate and having a support surface surface-contacting with an outer surface of the support piece.

4. The apparatus of claim 2, wherein said elastic support means includes:
    a pair of cooperation bars each having one end engaged to the rotation plate, respectively, and cooperating with each other when the rotation plate is rotated;
    a spring member engaged to an outer surface of the cooperation bars and being contracted and extended when the cooperation bars are moved;
    a support piece fixed to the other ends of the cooperation bars wherein an outer surface of the support piece is formed in a circular shape; and
    a fixture engaged to be opposite to a bottom surface of the engaging groove of the body and having a support surface surface-contacting with an outer surface of the support piece.

5. The apparatus of claim 1, wherein said stopper means includes:
    an engaging groove and a fixing groove formed at both sides of the forward and backward portions of the upper plate; and
    a stopper protruded from a bottom surface of the lower plate and adapted to limit a movement of the upper plate in such a manner that the engaging groove and the fixing groove are engaged.

6. The apparatus of claim 1, wherein a groove is formed on a bottom surface of the upper plate in a vertical direction with respect to the moving direction of the upper plate, and an engaging member capable of slidably moving the upper plate is fixed to one end of the rotation plate when the engaging member is slidably moved in the interior of the groove.

7. The apparatus of claim 2, wherein a groove is formed on an inner surface of the cover in a vertical direction with respect to the moving direction of the cover, and an engaging member capable of slidably moving the cover is fixed to one end of the rotation plate when the engaging member is slidably moved in the interior of the groove.

8. The apparatus of claim 2, wherein said stopper means includes:
    an engaging groove and a fixing groove integrally formed on an inner surface of the cover at left and right sides in the forward and backward portions; and
    a stopper protruded from a bottom surface of the engaging groove and adapted to limit a movement of the cover in such a manner that the engaging groove and the fixing groove are engaged with each other.

9. The apparatus of claim 1, further comprising:
    a flange portion formed at left and right sides of the upper plate; and a guide rail provided in the lower plate to correspond with the flange portion and adapted to support the upper plate which is slidably moved with respect to the lower plate.

10. The apparatus of claim 1, further comprising:
a guide shoulder portion protruded from an upper surface of the lower plate and being capable of distancing the rotation plate from the lower plate for thereby achieving a smooth rotation.

11. The apparatus of claim 2, further comprising:
a guide shoulder portion protruded from a bottom surface of the engaging groove of the body and being capable of distancing the rotation plate from the bottom surface of the engaging groove for thereby achieving a smooth rotation.

12. An apparatus for opening and closing a cover of a cellular phone, comprising:
a body having a keypad;
a cover engaged to the body slidably in forward and backward directions and having a display panel;
an upper plate engaged to a lower surface of the cover wherein a first gear is provided on a bottom surface of the upper plate;
a lower plate provided on an upper surface of the body wherein the upper plate is slidably engaged to the lower plate, and a second gear engaged with the first gear is rotatably engaged to the lower plate;
an elastic support means having one end fixed to the second gear and the other end movably supported by an upper surface of the lower plate, wherein said elastic support means elastically supports the second gear when the upper plate is slidably moved; and
a stopper means provided in the upper and lower plates and adapted to limit a slidable movement of the upper plate with respect to the lower plate.

13. An apparatus and opening and closing a cover of a cellular phone, comprising:
a body having a keypad;
a cover engaged to the body slidably in forward and backward directions and having a display panel;
a first gear integrally formed with an inner surface of the cover;
a second gear rotatably engaged to an engaging groove formed on an upper surface of the body, and engaged with the first gear, and adapted to slidably move the cover in forward and backward directions with respect to the body;
an elastic support means having one end fixed to the second gear and the other end movably supported by a bottom surface of the engaging groove and adapted to elastically support the second gear when the cover is slidably moved; and
a stopper means provided on a bottom surface of the cover and adapted to limit a slidable movement of the cover with respect to the body.

14. The apparatus of claim 12, wherein said elastic support means includes:
a pair of cooperation bars each having one end engaged to the second gear, respectively, and cooperating with each other when the second gear is rotated;
a spring member engaged to an outer surface of the cooperation bars and being contracted and extended when the cooperation bars are moved;
a support piece fixed to the other ends of the cooperation bars wherein an outer surface of the support piece is formed in a circular shape; and
a fixture engaged to be opposite to an upper surface of the lower plate and having a support surface surface-contacting with an outer surface of the support piece.

15. The apparatus of claim 12, wherein said stopper means includes:
an engaging groove and a fixing groove formed at both sides of the forward and backward portions of the upper plate; and
a stopper protruded from a bottom surface of the lower plate and adapted to limit a movement of the upper plate in such a manner that the engaging groove and the fixing groove are engaged.

16. The apparatus of claim 13, wherein said stopper means includes a stopper downwardly protruded from an inner surface of the cover and adapted to limit a slidable movement of the cover by surface-contacting with a lateral surface of the engaging groove when the cover is slidably moved.

17. The apparatus of claim 12, further comprising:
a flange portion formed at left and right sides of the upper plate; and
a guide rail provided in the lower plate to correspond with the flange portion and adapted to support the upper plate which is slidably moved with respect to the lower plate.

18. The apparatus of claim 17, wherein a locking means capable of fixing the upper plate with respect to the lower plate includes:
an engaging protrusion outwardly protruded from the flange portion of the upper plate; and
at least more than one locking groove provided in an inner side of the guide rail of the lower plate and adapted to correspond with the lower plate.

19. The apparatus of claim 12, wherein said first gear is formed of a rack gear, and said second gear is formed of a pinion gear.

20. The apparatus of claim 13, wherein said elastic support means includes:
a pair of cooperation bars each having one end engaged to the second gear, respectively, and cooperating with each other when the second gear is rotated;
a spring member engaged to an outer surface of the cooperation bars and being contracted and extended when the cooperation bars are moved;
a support piece fixed to the other ends of the cooperation bars wherein an outer surface of the support piece is formed in a circular shape; and
a fixture engaged to be opposite to a bottom surface of the engaging groove of the body and having a support surface surface-contacting with an outer surface of the support piece.

* * * * *